(12) United States Patent
Roh et al.

(10) Patent No.: US 12,555,966 B2
(45) Date of Patent: Feb. 17, 2026

(54) DATA SIGNAL TRANSMISSION CONNECTOR

(71) Applicant: TSE CO., LTD, Cheonan-si (KR)

(72) Inventors: Dea Hyun Roh, Cheonan-si (KR); Yun Chan Nam, Cheonan-si (KR)

(73) Assignee: TSE CO., LTD. (KR)

( * ) Notice: Subject to any disclaimer, the term of this patent is extended or adjusted under 35 U.S.C. 154(b) by 331 days.

(21) Appl. No.: 18/457,758

(22) Filed: Aug. 29, 2023

(65) Prior Publication Data
US 2024/0079835 A1    Mar. 7, 2024

(30) Foreign Application Priority Data

Sep. 1, 2022  (KR) .................... 10-2022-0110499

(51) Int. Cl.
*H01R 33/94*      (2006.01)
*G01R 31/28*      (2006.01)
*H01R 13/405*     (2006.01)

(52) U.S. Cl.
CPC ............. *H01R 33/94* (2013.01); *G01R 31/28* (2013.01); *H01R 13/405* (2013.01)

(58) Field of Classification Search
CPC ........ G01R 31/3025; G01R 31/318513; G01R 31/28; G01R 31/2808; G01R 1/04;
(Continued)

(56) References Cited

U.S. PATENT DOCUMENTS 6,969,622 B1 * 11/2005 Kokubo ............ H01R 13/2414
                                                       324/755.09
8,410,808 B2 *  4/2013 Naoi .................... G01R 1/0735
                                                       324/762.01
(Continued)

FOREIGN PATENT DOCUMENTS

KR    10-2015-0125272 A    11/2015
KR    10-2017-0058677 A     5/2017
(Continued)

OTHER PUBLICATIONS

Office Action dated Apr. 24, 2024 (10 pages) from related Korean Application No. 10-2022-0110499 with English translation.
(Continued)

*Primary Examiner* — Vinh P Nguyen
(74) *Attorney, Agent, or Firm* — Crowell & Moring LLP; Trevor K. Copeland (57) ABSTRACT

A signal transmission connector including a frame base in which a first through hole and a second through hole are alternately formed and a frame including a frame top plate having a third through hole at each position corresponding to the first through hole and covering a top surface of the frame base. A frame bottom plate having a fourth through hole at each position corresponding to the first through hole and covering a bottom surface of the frame base and a conductive part disposed on a conductive part hole including a first through hole, a third through hole, and a fourth through hole and being in the form of a plurality of conductive particles in the elastic insulating material, wherein the frame is made of an inelastic insulating material. An air layer is formed in the second through hole sealed by the frame top plate and the frame bottom plate.

8 Claims, 6 Drawing Sheets

(58) Field of Classification Search
CPC ............... G01R 1/0416; G01R 1/0735; G01R 31/2863; G01R 1/0466; G01R 1/06772; G01R 1/06716; G01R 1/07378; G01R 31/2889; G01R 1/07314; G01R 1/06711; H01R 13/2414; H01R 43/007; H01R 33/94; H01R 13/405; H01R 12/7082; H01R 13/02; H01R 13/502; H01R 13/40
See application file for complete search history.

(56) References Cited

U.S. PATENT DOCUMENTS

| | | | |
|---|---|---|---|
| 10,802,048 B2 * | 10/2020 | Yamada | ............... G01R 1/0735 |
| 11,506,705 B2 | 11/2022 | Oh | |
| 11,573,248 B2 | 2/2023 | Oh | |
| 11,693,027 B2 * | 7/2023 | Kim | ..................... G01R 1/0441 |
| | | | 324/756.02 |
| 2015/0377926 A1 * | 12/2015 | Chen | ................... G01R 31/2891 |
| | | | 324/750.16 |
| 2022/0057433 A1 | 2/2022 | Oh | |
| 2022/0099730 A1 | 3/2022 | Oh | |

FOREIGN PATENT DOCUMENTS

| | | |
|---|---|---|
| KR | 10-2036105 B1 | 10/2019 |
| KR | 10-2020-0024462 A | 3/2020 |
| KR | 10-2342480 B1 | 12/2021 |
| KR | 10-2359547 B1 | 2/2022 |
| TW | 202133500 A | 9/2021 |
| TW | 202146903 A | 12/2021 |

OTHER PUBLICATIONS

Notice of Allowance dated Jun. 26, 2024 (7 pages) from related Taiwanese Application No. 112132991 with English translation.

* cited by examiner

FIG. 1

PRIOR ART

DATA SIGNAL TRANSMISSION CONNECTOR

This application claims under 35 U.S.C. § 119 (a) the benefit of the filing date of Korean Patent Application No. 10-2022-0110499, filed on Sep. 1, 2022.

BACKGROUND OF THE INVENTION

Technical Field

The present invention relates to a signal transmission connector, and more specifically, a signal transmission connector used to transmit an electrical signal by connecting to a semiconductor device.

Background Art

Currently, various types of connectors are used to transmit electrical signals in various fields such as the electronics industry and the semiconductor industry.

In the case of semiconductor devices, they are manufactured through a pre-process, post-process, and test process, of which the test process is a process of testing whether the semiconductor device is operating normally and sorting out good and defective products.

One of the key components in the test process is the signal transmission connector, the so-called test socket. The test socket is mounted on a printed circuit board electrically connected to the tester for integrated circuit testing and is used for the inspection of semiconductor devices. The test socket is equipped with a contact pin, which electrically connects the terminals (leads) of the semiconductor device and the terminals of the printed circuit board. The tester generates an electrical signal to test the semiconductor device to be connected to the test socket, outputs it to the semiconductor device, and then tests whether the semiconductor device operates normally using the electrical signal input through the semiconductor device, and determines whether the semiconductor device is good or defective according to the result.

Test sockets include typically pogo sockets and rubber sockets.

Pogo sockets are constructed by assembling individually manufactured pogo pins in a housing, and because of problems such as package ball damage and unit cost increase, the demand for rubber sockets has increased more than pogo sockets in the semiconductor test process in recent years.

Rubber sockets have a structure in which conductive parts in the form of containing a plurality of conductive particles in the interior of a material having an elastic force such as silicon are disposed to be insulated from each other inside an insulating part made of a material having an elastic force such as silicon. These rubber sockets have the property of conductivity only in the thickness direction, and since mechanical means such as soldering or springs are not used, they have the advantage of excellent durability and simple electrical connection. In addition, since it can absorb mechanical shocks and deformations, it has the advantage of smooth connection with semiconductor devices.

Figure 1:
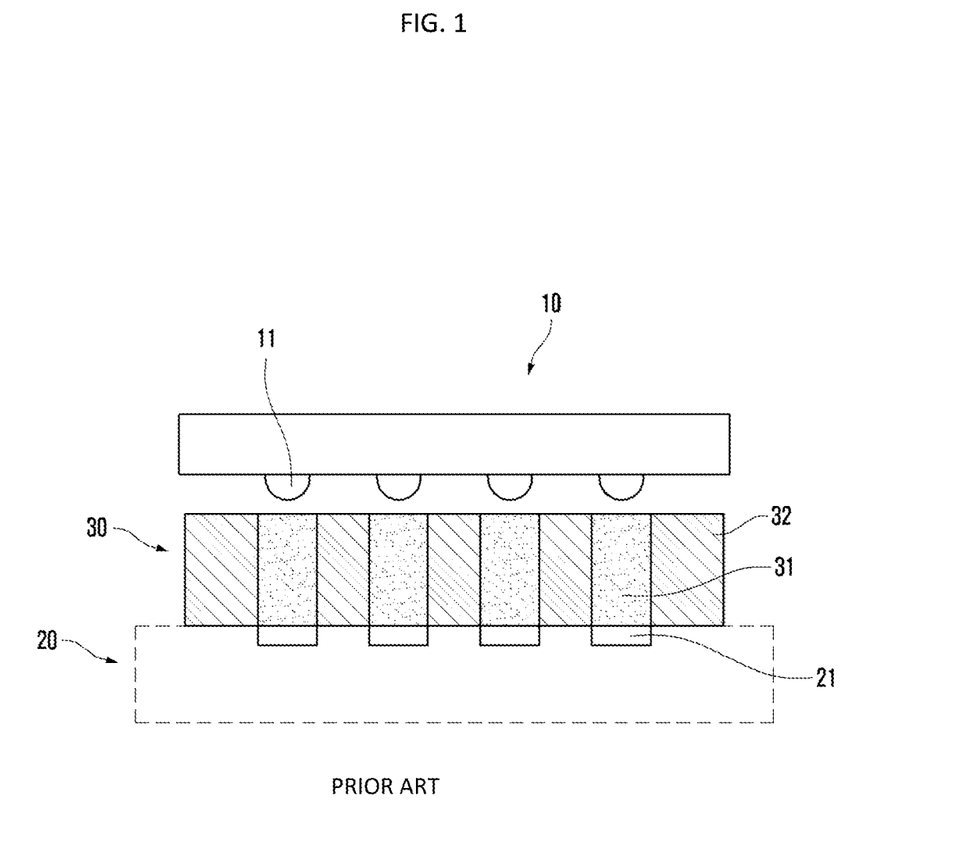
FIG. 1 is a diagram illustrating a conventional signal transmission connector used in a test process of a semiconductor device.

FIG. 1 schematically illustrates a signal transmission connector consisting of a conventional rubber socket used in a test process of a semiconductor device.

The conventional signal transmission connector 30 shown in FIG. 1 includes a plurality of conductive parts 31 in contact with the terminal 11 of the semiconductor device 10 (device under test) and an insulating part 32 supporting the conductive part 31 to be separated from each other.

The conductive part 31 may be a form in which a plurality of conductive particles are included in an elastic insulating material such as silicon, and some may be a conductive part for signaling, another part may be a conductive part for grounding, and another part may be a conductive part for electric power. And the insulating part 32 consists of an elastic insulating material such as silicon.

The signal transmission connector 30 acts as a connector or a test socket by electrically connecting the tester and the device under test by making the upper part of the conductive part 31 contact with the terminal of the device under test and making the lower part of the conductive part 31 contact with the pad 21 of the tester 20.

The signal transmission connector 30 composed of a conventional rubber socket is constituted with a conductive part and an insulating part made of an elastic insulating material such as silicon, and when the operating frequency of the test is low, the effect because of the characteristic impedance is limited and therefore the size of the conductive part and the spacing between the conductive parts are generally determined according to the pitch. The characteristic impedance of the signal transmission connector composed of a conventional rubber socket is about 20-30 ohms.

However, in the case of high-speed signal transmission with a high operating frequency, the characteristic impedance among the device under test, the signal transmission connector and the tester must be matched to enable signal transmission without signal interference or distortion. In general, if the characteristic impedance matching in the single-ended signal transmission method is configured to be 50 ohms±20% and the characteristic impedance matching in the differential pair signal transmission method is configured to 100 ohms±20%, they can be utilized in the high-speed signal transmission.

Therefore, in the signal transmission connector used for high-speed signal transmission with a high operating frequency, the characteristic impedance value should be increased so that the characteristic impedance matching among the device under test, the signal transmission connector and the tester is achieved.

In a signal transmission connector composed of a rubber socket, the characteristic impedance of the signal transmission connector is determined by factors such as the constituent material of the rubber socket, the size of the conductive part, and the spacing between the conductive parts. To increase the characteristic impedance to the impedance matching value, a method of adjusting the width of the conductive part or the spacing between the conductive parts was used in the past, but there was a limitation in increasing the characteristic impedance value because of the insulating part composed of an elastic insulating material such as silicon with a permittivity of about 4 to 9.

As a result, there was a problem that the characteristic impedance among the device under test, the signal transmission connector and the tester at a high operating frequency was mismatched and a high-quality high-speed signal could not be transmitted because of the reflection and loss of the input signal.

RELATED ART (Patent Document 1) Republic of Korea Patent Publication No. 2017-0058677 (May 29, 2017)

SUMMARY OF THE INVENTION

The purpose of the present invention, as devised in consideration of the above-described points, is to provide a signal transmission connector capable of transmitting a high-quality signal at high-speed in an impedance matching with the device under test and the tester by increasing the characteristic impedance value through insulating the adjacent conductive parts with a frame of an inelastic insulating material having an air layer.

A signal transmission connector according to the present invention for solving the above objective is a signal transmission connector that connects a terminal of a device under test to a pad of a tester that generates a test signal and performs an electrical test of the device under test, and comprises a frame base in which the first through hole and the second through hole are alternately formed; a frame consisting of a frame top plate having a third through hole at each position corresponding to the first through hole and covering the top surface of the frame base, and a frame bottom plate having a fourth through hole at each position corresponding to the first through hole and covering the bottom surface of the frame base; and a conductive part disposed on a conductive part hole consisting of a first through hole, a third through hole, and a fourth through hole, being in the form of a plurality of conductive particles in the elastic insulating material, and having the bottom end connected to the pad of the tester and having the top end connected to the terminal of the device under test, wherein it is characterized that the frame is made of an inelastic insulating material and an air layer is formed in the second through hole sealed by the frame top plate and the frame bottom plate.

The inelastic insulating material may be any one of polyimide or FR4.

The frame base may be formed by stacking a plurality of pieces.

A guide film is attached to the frame top plate, and a guide portion progressively decreasing in width from the top surface of the guide film to the frame side may be formed in the guide film.

The conductive part may include a conductive body placed in the conductive part hole, a conductive upper bump connected to the conductive body and protruding from the top surface of the frame, and a conductive lower bump connected to the conductive body and protruding from the bottom surface of the frame.

A relief film is attached to the frame bottom plate, but it is attached in a state spaced apart from the conductive lower bump, and an expansion and absorption space portion may be provided between the relief film and the conductive lower bump.

The conductive lower bump may be formed by protruding lower than the relief film.

The conductive part hole and the second through hole may be cylindrical or square pillar shaped.

The signal transmission connector according to the present invention can reduce the permittivity by forming an air layer in the frame disposed between the conductive parts, so that the characteristic impedance value is increased, enabling impedance matching with the device under test and the tester, thereby enabling high-speed signal transmission without signal reflection or loss.

In the signal transmission connector according to the present invention, since the conductive parts are spaced apart in the frame of the inelastic insulating material, each conductive part can be freely moved up and down independently, and the frame of the inelastic insulating material acts as a hard stop to prevent excessive stroke from being applied to the signal transmission connector, thereby preventing over-stroking of the signal transmission connector, leading to an extended lifespan of the connector.

In addition, since the conductive part is disposed in the frame of the inelastic insulating material, the signal transmission connector according to the present invention can prevent the conductive part from expanding or detaching even if the terminal of the device under test is compressed, thereby improving the durability of the signal transmission connector and securing a low resistance value.

In addition, the signal transmission connector according to the present invention provides an expansion and absorption space portion by a relief film attached in a state separated from the conductive lower bump, so that the conductive lower bump expands in the expansion absorption space portion and the problems of easy damage to the conductive part and shortened lifespan of the signal transmission connector caused by the applied pressure transmitted through the device under test being concentrated on the lower portion of the conductive part, do not occur.

DETAILED DESCRIPTION

Hereinafter, the signal transmission connector according to the present invention is described in detail with reference to the drawings.

Since the present invention may make various changes and may have various embodiments, specific embodiments are illustrated in the drawings and described in detail in the detailed description. However, this is not intended to limit the present invention to a specific embodiment, but should be understood to include all changes, equivalents or replacements included in the scope of idea and technology of the present invention.

When a component is referred to as "connected" or "interconnected" to another component, it should be understood that it may be directly connected or interconnected to the other component, but there may be other components in between. On the other hand, when a component is referred to as "directly connected" or "directly interconnected" to another component, it should be understood that no other component exists in between.

Terms used in the present specification are used only to describe a particular embodiment and are not intended to limit the present invention. Singular expressions include plural expressions, unless the context clearly means otherwise.

In the present specification, it should be understood that the terms "include" or "have" are intended to specify the existence of a feature, number, step, motion, component, part, or combination thereof described in the specification, but they do not exclude in advance the possibility of the existence or addition of one or more other features, numbers, steps, motions, components, parts, or combinations thereof.

Terms such as the first and the second may be used to describe various components, but the components should not be limited by the terms. The terms are used only for the purpose of distinguishing one component from another.

In addition, it is natural that the components of the embodiment described with reference to each drawing are not limited to the embodiment and may be implemented to be included in other embodiments to the extent that the technical idea of the present invention is maintained, and even if a separate description is omitted, a plurality of embodiments may be re-implemented as one integrated embodiment.

In addition, in describing with reference to the accompanying drawings, the same component is given the same or related reference numerals regardless of the drawing code, and duplicate descriptions thereof are omitted. In describing the present invention, if it is judged that a detailed description of the related known art may unnecessarily obscure the gist of the present invention, the detailed description thereof is omitted.

Figure 2A:
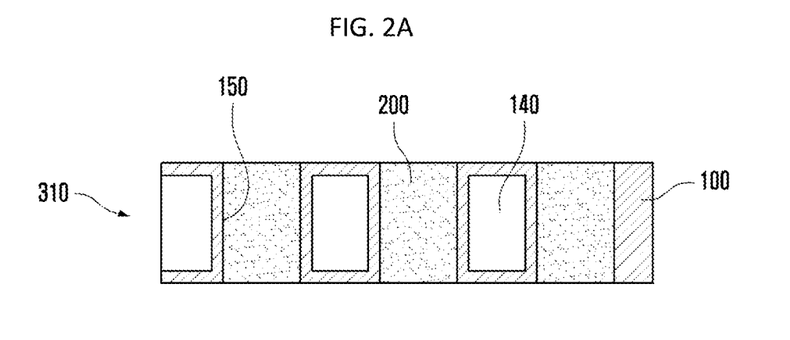
FIGS. 2A-2C are diagrams illustrating signal transmission connectors of various structures according to the present invention.
Figure 2B:
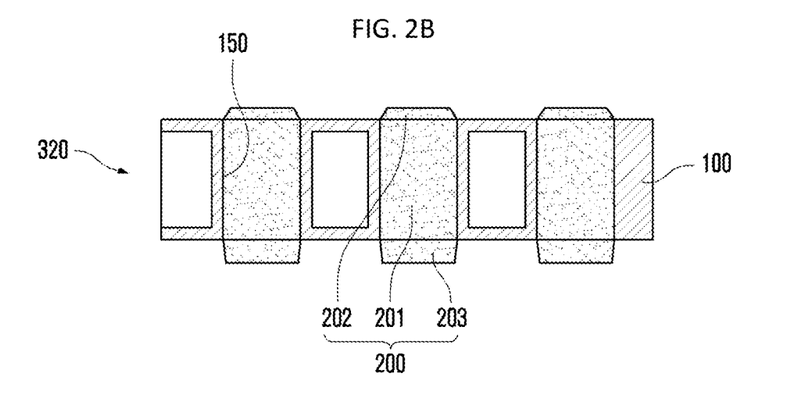
Figure 2C:
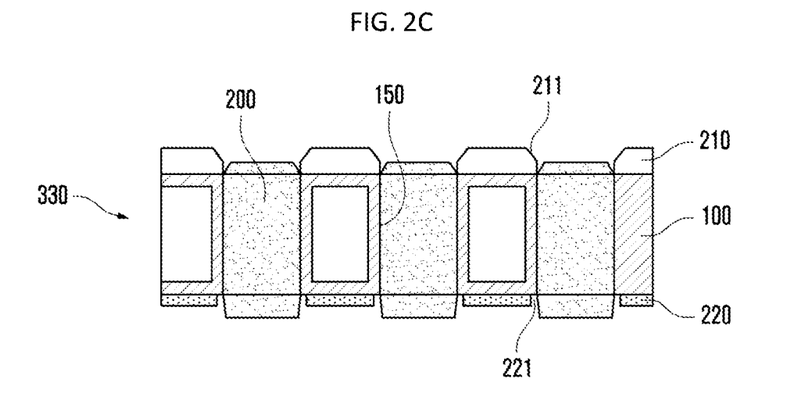
Figure 3A:
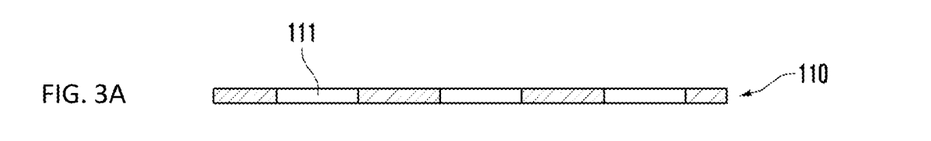
FIGS. 3A-3E are diagrams illustrating the formation process of a frame in a signal transmission connector according to an embodiment of the present invention.
Figure 3B:
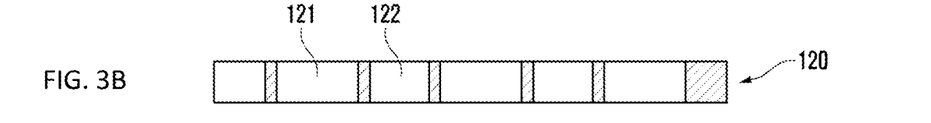
Figure 3C:
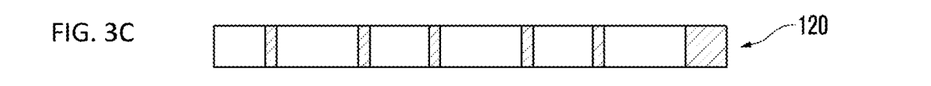
Figure 3D:
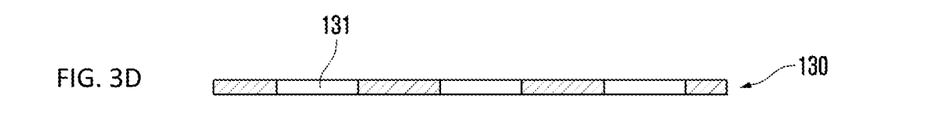
Figure 3E:
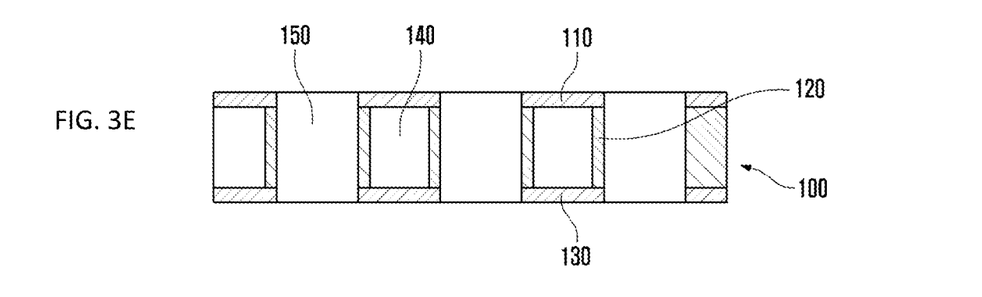
Figure 4A:
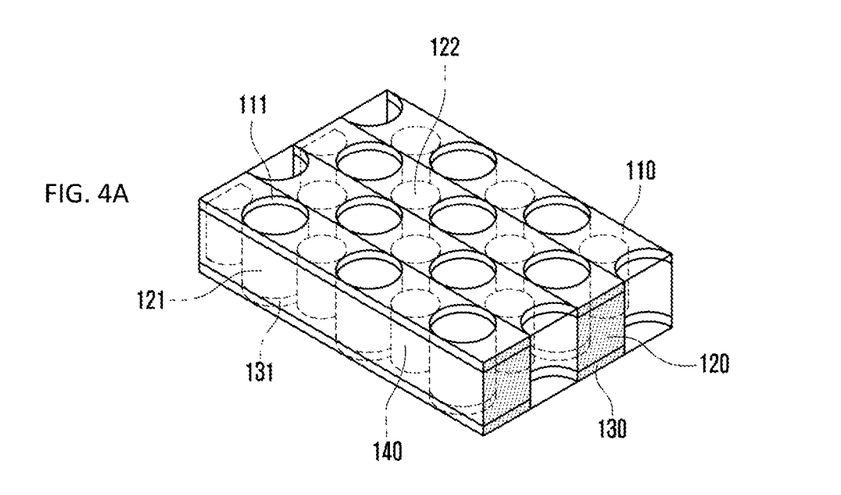
FIGS. 4A and 4B are perspective views illustrating a frame of a signal transmission connector according to an embodiment of the present invention.
Figure 4B:
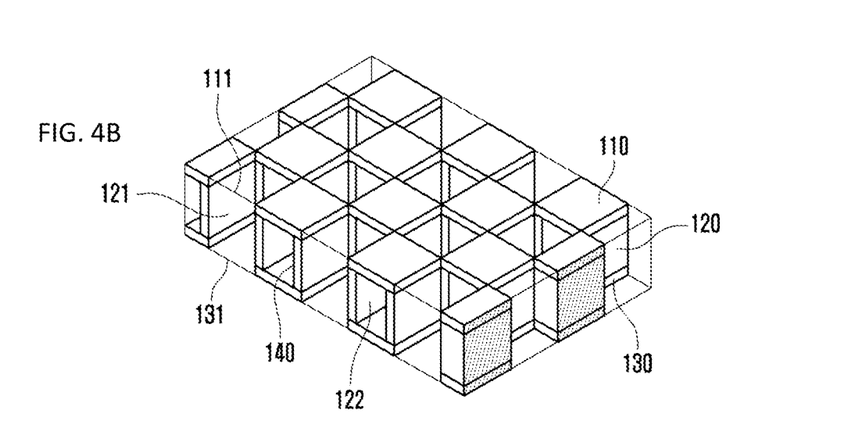
Figure 5A:
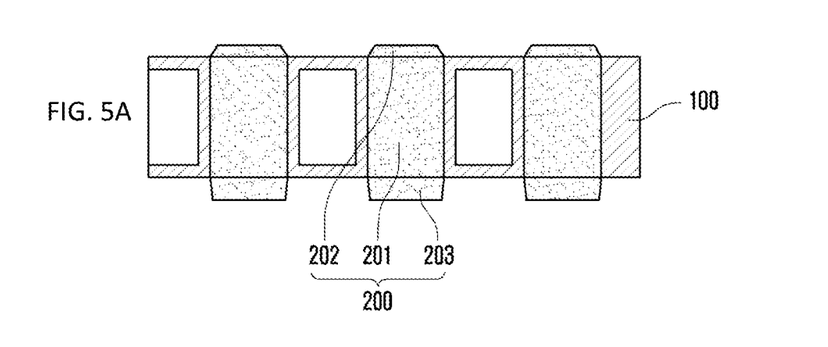
FIGS. 5A and 5B are diagrams illustrating a process in which a conductive part, a guide film, and a relief film are formed on a frame of a signal transmission connector according to an embodiment of the present invention.
Figure 5B:
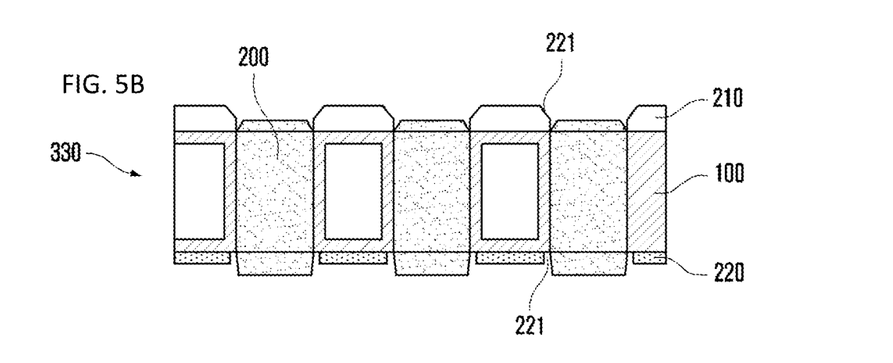
Figure 6A:
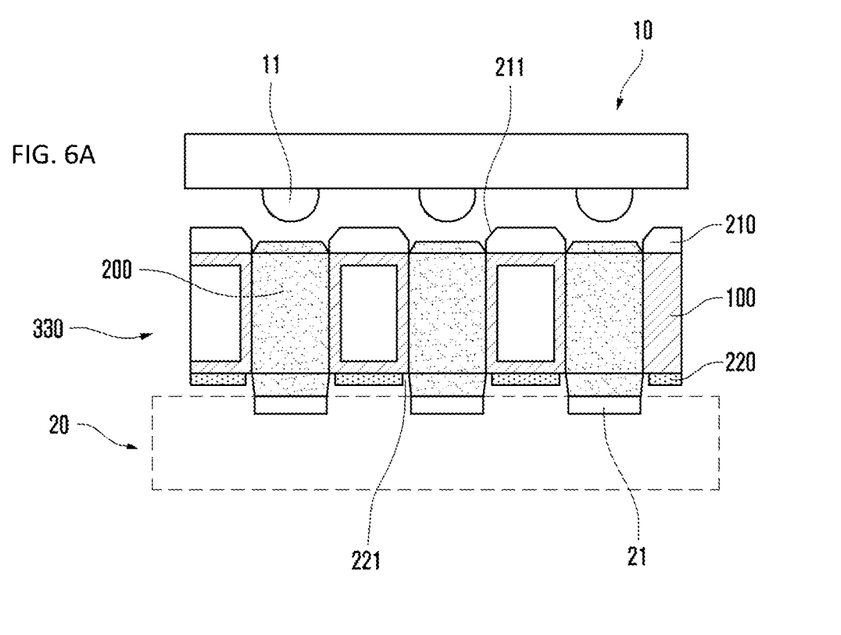
FIGS. 6A and 6B are diagrams illustrating a signal transmission connector used in a test process of a semiconductor device according to an embodiment of the present invention.
Figure 6B:
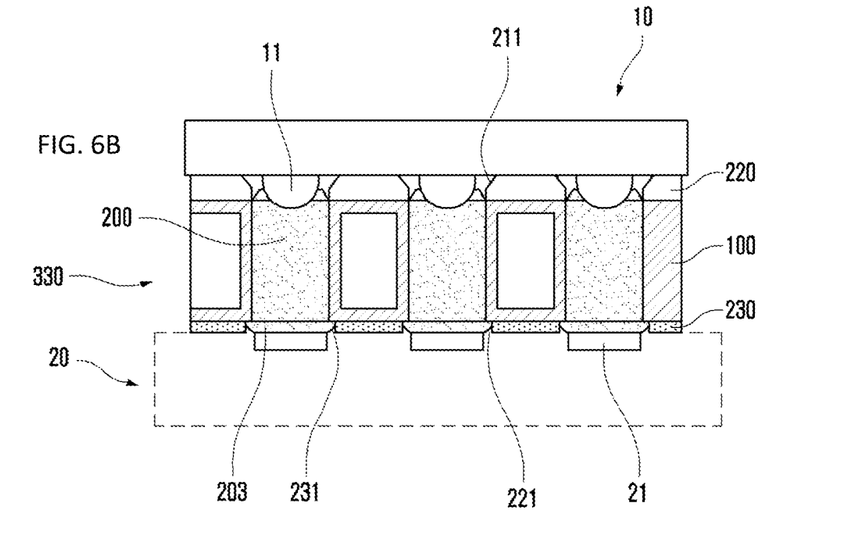

FIGS. 2A-2C are diagrams illustrating signal transmission connectors of various structures according to the present invention, FIGS. 3A-3E are diagrams illustrating the formation process of a frame in a signal transmission connector according to an embodiment of the present invention, FIGS. 4A and 4B are perspective views illustrating a frame of a signal transmission connector according to an embodiment of the present invention, FIGS. 5A and 5B are diagrams illustrating a process in which a conductive part, a guide film, and a relief film are formed on a frame of a signal transmission connector according to an embodiment of the present invention and FIGS. 6A and 6B are diagrams illustrating a signal transmission connector used in a test process of a semiconductor device according to an embodiment of the present invention.

As shown in FIGS. 2A-2C, the signal transmission connectors 310, 320, and 330 according to the present invention, in a signal transmission connector that connects a terminal 11 of a device under test 10 to a pad 21 of a tester 20 that generates a test signal and performs an electrical test of the device under test, comprise a frame base 120 in which the first through hole 121 and the second through hole 122 are alternately formed; a frame 100 consisting of a frame top plate 110 having a third through hole 111 at each position corresponding to the first through hole and covering the top surface of the frame base, and a frame bottom plate 130 having a fourth through hole 131 at each position corresponding to the first through hole and covering the bottom surface of the frame base; and a conductive part 200 disposed on a conductive part hole 150 consisting of a first through hole 121, a third through hole 111, and a fourth through hole 131, being in the form of a plurality of conductive particles in the elastic insulating material, and having the bottom end connected to the pad of the tester and having the top end connected to the end of the device under test, wherein it is characterized that the frame 100 is made of an inelastic insulating material and an air layer 140 is formed in the second through hole 122 sealed by the frame top plate 110 and the frame bottom plate 130.

The signal transmission connectors 310, 320, and 330 of the present invention may be used to inspect the device under test 10 through the tester 20 by being connected and transmitting an electrical signal to the device under test 10, or transmit an electrical signal by electrically connecting the device under test 10 and various electronic devices.

As shown in FIGS. 2 to 4, the frame 100, as a portion forming the body of the signal transmission connectors 310, 320, 330, consist of a frame base 120 in which the first through hole 121 and the second through hole 122 are alternately formed in the thickness direction; a frame top plate 110 having a third through hole 111 at each position corresponding to the first through hole and covering the top surface of the frame base; and a frame bottom plate 130 having a fourth through hole 131 at each position corresponding to the first through hole 130 and covering the bottom surface of the frame base.

The frame base 120 is a portion that forms the body of the frame 100, and as shown in FIG. 3B and FIG. 3C, a first through hole 121 and a second through hole 122 are formed alternately in the frame base 120. The first through hole 121 is formed at each position corresponding to the terminal 11 of the device under test, and the second through hole 122 is disposed between the first through holes 121.

The frame base 120 may be formed by stacking a plurality of pieces. This is to ensure that when the material constituting the frame has a limited thickness, a plurality of pieces are stacked to have the required thickness. FIGS. 3A-3E illustrate FIG. 3 illustrates an example of two frame bases 120 being stacked.

The frame top plate 110 is attached to the top surface of the frame base 120. As shown in FIG. 3A, since the third through hole 111 is formed in the frame top plate 110 at each position corresponding to the first through hole 121, when the frame top plate 110 is attached to the top surface of the frame base 120, the frame top plate 110 covers the second through hole 122 of the frame base, and the third through hole 111 is disposed to be connected to the first through hole 121 of the frame base.

The frame bottom plate 130 is attached to the bottom surface of the frame base 120. As shown in FIG. 3D, since the fourth through hole 131 is formed in the frame bottom plate 130 at each position corresponding to the first through hole 121, when the frame bottom plate 130 is attached to the bottom surface of the frame base 120, the frame bottom plate 130 covers the second through hole 122 of the frame base, and the fourth through hole 131 is disposed to be connected to the first through hole 121 of the frame base.

As shown in FIG. 3E, when the frame top plate 110 and the frame bottom plate 130 are firmly attached to the frame base 120 using adhesives, etc., an integrated frame 100 is formed. Thus, in the frame 100, a conductive part hole 150 is formed in which the first through hole 121, the third through hole 111, and the fourth through hole 131 are connected to one another, the second through hole 122 of the frame base 120 is sealed by the frame top plate 110 and the frame bottom plate 130, and an air layer is formed in the second through hole 122 thus sealed. And in the conductive part hole 150, the conductive part 200 described later is disposed.

The frame 100 consists of an inelastic insulating material. Polyimide, FR4, or other various inelastic insulating materials may be used as inelastic insulating materials, but it is preferable to use materials with low permittivity. The frame 100 of the inelastic insulating material has a hardness of such a degree that compression deformation does not occur because of the maximum pressure applied through the device under test 10 in the test process, and has a feature of not being elastically deformed easily, unlike the elastic insulating part of a conventional rubber socket.

As shown in FIGS. 4A and 4B, the first through hole to the fourth through hole may be a cylindrical shape or a square pillar shape, and may be formed into various shapes such as polygonal pillars without limitation thereto.

The conductive part 200 may be disposed in the conductive part hole 150 formed by connecting the first through hole 121, the third through hole 111 and the fourth through hole 131 to one another, as shown in FIG. 2A. The conductive part 200 is made in the form of containing a plurality of conductive particles in the elastic insulating material, and the lower part of the conductive part is connected to the pad 21 of the tester, and the upper part is formed so that it can be connected to the terminal 11 of the device under test.

The conductive part 200 may consist of a plurality of conductive particles in the elastic insulating material aligned in the thickness direction of the frame 100 by the application of a magnetic field during the manufacturing process. Therefore, it is preferable that the conductive particles constituting the conductive part 200 should have magnetism so that they can react by a magnetic field, and the elastic insulating material constituting the conductive part 200 may be a heat-resistant polymer material having a crosslinking structure, for example, silicone rubber.

The conductive part 200 may be formed by filling a conductive particle mixture where the conductive particle is dispersed, in the elastic insulating material of the conductive part hole 150, placing an electromagnet on the top part and bottom part of the conductive part hole 150, and applying a magnetic field in the direction of the thickness of the frame 100 so that the conductive particles are aligned in the direction of the thickness of the frame and are solidified.

In addition, the conductive part 200 may include a conductive body 201 placed in the conductive part hole 150 as shown in FIG. 2B, a conductive upper bump 202 connected to the conductive body 201 and protruding from the top surface of the frame 100, and a conductive lower bump 203 connected to the conductive body 201 and protruding from the bottom surface of the frame 100. Of course, it is also possible for the conductive part 200 to have either the conductive upper bump 202 or the conductive lower bump 203.

The conductive particle density of the conductive upper bump 202 and the conductive lower bump 203 may be equal to or greater than the density of the conductive particles of the conductive body 201.

In addition, as shown in FIG. 2C, a guide film 210 may be attached to the frame top plate 110, and the guide film 210 may be constituted to form a guide portion 211 in which the width gradually decreases from the top surface of the guide film to the frame 100 side.

Since the signal transmission connector 330 of this structure has a tapered guide portion 211 on the guide film 210, when the device under test 10 approaches the frame 100 side, the terminal 11 of the device under test 10 may be guided by the guide portion 211 of the guide film and be in more stable contact with the conductive part 200. The guide film 210 may be composed of an inelastic insulator, and various materials such as polyimide may be used.

In addition, a relief film 220 thinner than the conductive lower bump 203 may be attached to the signal transmission connector 330 in which the conductive lower bump 203 is formed. Therefore, the conductive lower bump 203 has a form that protrudes lower than the relief film 220.

The signal transmission connector 330 of this structure may be constituted to provide an expansion and absorption space portion 221 between the relief film 220 and the conductive lower bump 203 by attaching the relief film 220 to the frame bottom plate 130 but attaching spaced apart from the conductive lower bump 203. As a material for the relief film 220, an inelastic insulator or a metal material may be used.

The expansion and absorption space portion 221 provided by the relief film 220 performs a function of relieving stress generated in the conductive lower bump 203 during a semiconductor device test. That is, as shown in FIGS. 6A and 6B, when the device under test 10 is pressed downward during the test of the semiconductor device and a stroke is applied to the conductive part 200 by the terminal 11 of the device under test, the conductive lower bump 203 is deformed while being pressed downward, and the expansion and absorption space portion 221 absorbs the deformed portion of the conductive lower bump 203, thereby reducing the stress generated at the bottom part of the conductive part 200.

Hereinafter, as shown in FIG. 2C, a signal transmission connector 330 with a guide film and a relief film attached to the frame will be described.

As shown in FIG. 4A, a conductive part 200 is disposed in the conductive part hole 150 of the frame 100 formed as shown in FIGS. 3 and 4. The conductive part 200 includes a conductive body 201, a conductive upper bump 202, and a conductive lower bump 203.

As shown in FIG. 4B, a signal transmission connector 330 according to an embodiment of the present invention is provided by a guide film 210 which guides the terminal 11 of the device under test being attached to the top surface of the frame in which the conductive part 200 is disposed, that is, the frame top plate 110, and a relief film 220 which prevents damage to the conductive lower bump 203 being attached to the bottom surface of the frame, that is, the frame bottom plate 130.

The signal transmission connector 330 constituted in this way may use a frame 100 having an air layer 140 between the conductive parts 200 and improve the characteristic impedance value compared to using an insulating part composed of an elastic insulation material such as conventional silicon.

The characteristic impedance $Z_0$ can be expressed by the following formula. Since the characteristic impedance is proportional to the inductance and has the feature of inversely proportional to the capacitance, to increase the characteristic impedance value, the inductance value must be increased, or the capacitance value must be lowered. However, capacitance C has a property that increases or decreases in proportion to the permittivity c of the dielectric between the conductive parts.

$$Z_0 = \sqrt{\frac{R + j\omega L}{G + j\omega C}} \approx \sqrt{\frac{L}{C}}$$

($L$: inductance, $C$: capacitance)

In the conventional signal transmission connector 30, an insulating part composed of silicone rubber is formed between the conductive parts, and the permittivity of the silicone rubber is about 4 to 9, so there is a limit to increasing the characteristic impedance value.

The signal transmission connector 330 according to an embodiment of the present invention may reduce significantly the overall permittivity by constituting a frame made of an inelastic insulating material with a lower permittivity than that of a conventional silicone rubber between the conductive parts 200, and forming the frame to have an air layer 140 with a permittivity of 1.

It is known that the permittivity of polyimide, which is an inelastic insulating material, is about 3.3, and the permittivity of FR4 is about 4-4.5. Even if the material of the frame 100 is FR4, since the frame has an air layer 140 with a permittivity of 1, the overall permittivity is much smaller than the minimum permittivity of silicone rubber, which is 4, and if the volume of the air layer 140 is increased by thinning the frame, the overall permittivity may be further lowered and therefore it is possible to use FR4 as a frame material. However, when the material of the frame 100 is made of polyimide having a permittivity lower than that of silicone rubber, the overall permittivity is further lowered and so it is more preferable.

As described above, the signal transmission connector 330 according to an embodiment of the present invention may implement a favorable sign transmission connector for impedance matching between the device under test and the tester as the signal transmission connector significantly lowers the permittivity of the frame between the conductive parts, leading to a decrease in the capacitance value, so that the characteristic impedance value of the signal transmission connector is increased.

Therefore, the signal transmission connectors 310, 320, and 330 of the present invention may form an air layer in the frame disposed between the conductive parts and reduce the permittivity, so that the characteristic impedance value is increased, thereby enabling impedance matching with the device under test and the tester and, as a result, there is an effect of enabling high-speed signal transmission without signal reflection or loss.

FIGS. 6A and 6B illustrate a test process of a semiconductor device using a signal transmission connector 330 according to an embodiment of the present invention.

As shown in the drawing, when the pressurization means (not shown) pressurizes the device under test 10 for testing the device under test 10, the terminal 11 of the device under test 10 is squeezed to the conductive upper bump 202, and the conductive lower bump 203 is squeezed to the pad 21 of the tester 20. At this time, the test signal generated by the tester 20 may be transmitted to the device under test 10 through the signal transmission connector 330 to perform an electrical test on the device under test 10.

When the terminal 11 of the device under test 10 is squeezed to the conductive part 200 of the signal transmission connector 330, the conductive part 200 has elastic force, so that the terminal 11 elastically deforms the conductive part 200 and enters the conductive part hole 150. At this time, the bottom surface of the device under test 10 may touch the top surface of the guide film 210. Since the guide film 210 and the frame 100 below it are made of an inelastic insulating material, when the bottom surface of the device under test 10 touches the guide film 210 disposed on the upper side of the frame 100, it no longer descends. In addition, as the conductive lower bump 203 is compressed by the pressure of the device under test 10 pressurizing the signal transmission connector 330, the bottom surface of the frame 100, which is an inelastic insulating material, touches the top surface of the tester 20. As the bottom surface of the frame 100 touches the top surface of the tester 20, the stroke does not increase further.

Therefore, in the signal transmission connectors 310, 320, and 330 of the present invention, since the conductive parts 200 are spaced apart in the frame 100 of the inelastic insulating material, each conductive part can move freely up and down independently, and the frame of the inelastic insulating material plays a hard stop role to prevent excessive stroke from being applied to the signal transmission connector, thereby preventing overstroke to the signal transmission connector and extending the lifespan of the signal transmission connector.

In addition, the signal transmission connectors 310, 320, and 330 of the present invention have a conductive part 200 disposed in the frame 100 of the inelastic insulating material, so that even if the terminal of the device under test 11 is compressed, the conductive part can be prevented from expanding or detaching, leading to an effect that the durability of the signal transmission connector is improved and the low resistance value is secured.

In addition, the signal transmission connector 330 of the present invention has an effect of not having the problems that the conductive part is easily damaged and the lifespan of the signal transmission connector is shorted because the pressure transmitted through the device under test is concentrated in the lower part of the conductive part, by providing the expansion and absorption space portion 221 by the relief film 220 attached in a state separated from the conductive lower bump 203 and enabling the conductive lower bump to expand in the expansion and absorption space portion.

Although the present invention has been described with a desirable example, the scope of the present invention is not limited to the forms described and shown above.

For example, the conductive part 200 is described to be formed by aligning the conductive particles dispersed in the elastic insulating material by a magnetic field, but the conductive part may be formed in a way of inserting a pre-manufactured conductive part, in which the conductive particles are aligned in the elastic insulating material, into the conductive part hole.

In the above, although the present invention has been shown and described in connection with desirable embodiments to illustrate the principles of the present invention, the present invention is not limited to the configuration and operation as shown and described as such. Rather, it will be well understood by those skilled in the art that a number of changes and modifications to the present invention can be made without deviating from the idea and scope of the inventions described herein.

In the above, although the present invention has been shown and described in connection with desirable embodiments to illustrate the principles of the present invention, the present invention is not limited to the configuration and operation as shown and described as such. Rather, it will be well understood by those skilled in the art that a number of changes and modifications to the present invention can be made without deviating from the idea and scope of the attached claims.

| [Explanation of code] | |
|---|---|
| 10: device under test | 20: tester |
| 30, 310, 320, 330: signal transmission connector | |
| 100: frame | 110: frame top plate |
| 111: third through hole | 120: frame base |
| 121: first through hole | 122: second through hole |
| 130: frame bottom plate | 131: fourth through hole |
| 140: air layer | 150: conductive part hole |
| 200: conductive part | 201: conductive part body |
| 202: conductive upper bump | 203: conductive lower bump |
| 210: guide film | 211: guide portion |
| 220: relief film | 221: expansion and absorption space portion |

The invention claimed is:

1. A signal transmission connector that connects a terminal of a device under test to a pad of a tester that generates a test signal and performs an electrical test of the device under test, comprising:
- a frame base in which a first through hole and a second through hole are alternately formed;
- a frame comprising a frame top plate having a third through hole at each position corresponding to the first through hole and covering the top surface of the frame base, and a frame bottom plate having a fourth through hole at each position corresponding to the first through hole and covering the bottom surface of the frame base; and
- a conductive part disposed on a conductive part hole comprising the first through hole, the third through hole, and the fourth through hole, being in the form of a plurality of conductive particles in an elastic insulating material, and having a bottom end connected to a pad of a tester and having a top end connected to a terminal of a device under test, wherein
the frame is made of an inelastic insulating material and an air layer is formed in the second through hole sealed by the frame top plate and the frame bottom plate.

2. The signal transmission connector of claim 1, wherein the inelastic insulating material is either polyimide or FR4.

3. The signal transmission connector of claim 1, wherein the frame base is formed by stacking a plurality of layers.

4. The signal transmission connector of claim 1, further comprising a guide film attached to the frame top plate, and a guide portion gradually decreasing in width from the top surface of the guide file to the frame side is formed in the guide film.

5. The signal transmission connector of claim 1, wherein the conductive part comprises: a conductive body disposed in the conductive part hole; a conductive upper bump connected to the conductive body and protruding from the top surface of the frame; and a conductive lower bump connected to the conductive body and protruding from the bottom surface of the frame.

6. The signal transmission connector of claim 5, further comprising a relief film attached to the bottom plate of the frame in a state spaced apart from the conductive lower bump so that an expansion and absorption space portion is provided between the relief film and the conductive lower bump.

7. The signal transmission connector of claim 6, wherein the conductive lower bump is formed protruding lower than the relief film.

8. The signal transmission connector of claim 1, wherein the conductive part hole and the second through hole are a cylindrical shape or a square pillar shape.

* * * * *